United States Patent
He et al.

(10) Patent No.: US 8,090,054 B2
(45) Date of Patent: Jan. 3, 2012

(54) METHOD FOR RECEIVING SIGNAL AND APPARATUS THEREOF

(75) Inventors: Wei-Hung He, Taipei Hsien (TW); Chin-Tai Chen, Taoyuan County (TW); Kuang-Yu Yen, Tai-Chung (TW)

(73) Assignee: Realtek Semiconductor Corp., Hsinchu (TW)

( * ) Notice: Subject to any disclaimer, the term of this patent is extended or adjusted under 35 U.S.C. 154(b) by 792 days.

(21) Appl. No.: 12/099,781

(22) Filed: Apr. 8, 2008

(65) Prior Publication Data
US 2008/0253483 A1 Oct. 16, 2008

(30) Foreign Application Priority Data
Apr. 14, 2007 (TW) .............................. 96113237 A

(51) Int. Cl.
*H03K 9/00* (2006.01)
(52) U.S. Cl. .................. 375/316; 348/725; 348/E5.108; 386/309; 455/188.1
(58) Field of Classification Search ........................ None
See application file for complete search history.

(56) References Cited

U.S. PATENT DOCUMENTS

| 7,187,913 B1 * | 3/2007 | Rahn et al. ................. 455/188.1 |
| 2003/0003880 A1 | 1/2003 | Ling |
| 2006/0001779 A1 | 1/2006 | Favrat et al. |

FOREIGN PATENT DOCUMENTS
TW 200608787 3/2006
* cited by examiner

*Primary Examiner* — David C. Payne
*Assistant Examiner* — Adolf Dsouza
(74) *Attorney, Agent, or Firm* — Thomas, Kayden, Horstemeyer & Risley, LLP

(57) ABSTRACT

A signal receiving apparatus includes a frequency converting circuit, a computing circuit, and a control circuit. The frequency converting circuit is for converting a RF signal to respectively generate a first converted signal and a second converted signal according to a first converting frequency and a second converting frequency. The computing circuit is for computing signal quality parameters of the first converted signal and the second converted signal. The control circuit is for outputting a control signal according to the signal quality parameters of the first converted signal and the second converted signal, wherein the control signal corresponds to the converting frequency of the frequency converting circuit.

20 Claims, 5 Drawing Sheets

METHOD FOR RECEIVING SIGNAL AND APPARATUS THEREOF

BACKGROUND OF THE INVENTION

1. Field of the Invention

The present invention relates to a broadcasting system, and particularly relates to a receiving apparatus of the broadcasting system.

2. Description of the Prior Art

Digital broadcasting signals can be classified into digital audio broadcasting (DAB) and digital video broadcasting (DVB). DAB has various standards such as European Standard Eureka-147 (which Taiwan follows), USA IBOC and France DRM, and DVB has DVB-T and DVB-H. Furthermore, each of the standards has different bandwidths; for example, DVB-T has a bandwidth of 6, 7 or 8 MHz, and DAB has a bandwidth of 1.536 MHz. Additionally, each nation also has its own standards; for example, Korea has T-DMB (Terrestrial Digital Multimedia Broadcasting). Therefore, a receiving system requires special design to receive these signals complying with different standards.

In order to integrate various standards into a single receiver, one method is to utilize a tuner, which includes a plurality of SAW filters with different bandwidths, but the cost will increase due to this method. FIG. 1 illustrates another conventional receiving system 100 for the DVB-T and DAB standards. Please refer to FIG. 1, the tuner 101 utilizes one SAW filter as a channel selecting filter to select DVB-T channels, a digital low-pass filter 107 can be utilized to select DAB channels for DAB standard with narrower signal bandwidths. The receiving system 100 includes a tuner 101, an ADC 103, a down converter 105, a digital low-pass filter 107, a FFT (Fast Fourier Transform) circuit 109, a post-processing circuit 111 and a synchronization circuit 113, wherein the synchronization circuit 113 is used for providing synchronization information to the FFT circuit 109. Since the detailed structures and operation of the conventional receiving system 100 are well known by persons skilled in the art, they are omitted for brevity. It should be noted that the output signal $S_{IF}$ of the tuner 101 always includes a plurality of DAB channels (ex: right and left adjacent channel signals (ACS)) when the receiving system 100 is set to receive a DAB signal. FIG. 2 illustrates the output signal of the tuner 101 in FIG. 1. Due to the effect of the large ACS interference, the ADC 103 and the digital circuit (ex: low-pass filter 107) may need more bit-number (resolution). At the same time, the output signal of the tuner 101 includes at least one of ACS signal with a large strength, and therefore the effect and sensitivity of the whole system will decrease. Thus, a new invention is needed to solve above-mentioned problems.

SUMMARY OF THE INVENTION

One objective of the present invention is to provide a signal receiving method and a related apparatus, such that the RF signal receiving system can utilize the same SAW filter to process signals of different standards.

Another objective of the present invention is to provide a signal receiving method and a related apparatus, thereby allowing an RF signal receiving system to operate at a better frequency to avoid the interference of ACS.

Another objective of the present invention is to provide a signal receiving method and a related apparatus, which controls a converting frequency of a frequency converting circuit to decrease the effect of ACS.

One embodiment of the present invention discloses a signal receiving apparatus, which comprises a frequency converting circuit, a computing circuit, and a control circuit. The frequency converting circuit is for converting an RF signal according to a first converting frequency and a second converting frequency to respectively generate a first converted signal and a second converted signal. The computing apparatus is coupled to the frequency converting circuit for computing signal quality parameters of the first and the second converted signals. The control circuit is coupled to the frequency converting circuit and the computing circuit, for outputting a control signal according to the signal quality parameters of the first and the second converted signals. The control signal corresponds to the first and second converting frequencies of the frequency converting circuit.

These and other objectives of the present invention will no doubt become obvious to those of ordinary skill in the art after reading the following detailed description of the preferred embodiment that is illustrated in the various figures and drawings.

DETAILED DESCRIPTION

In general, the signal intensity of a plurality of channel signals of the RF signal decrease or increase gradually. For example, the signal strength of a left ACS is larger than that of the desired signal, which has larger strength than that of a right ACS. Alternatively, the signal intensity of a left ACS is smaller than the signal intensity of the desired signal, which in turn has a smaller signal intensity than that of a right ACS. Such signal characteristics can be easily understood by persons skilled in the art.

Figure 2:
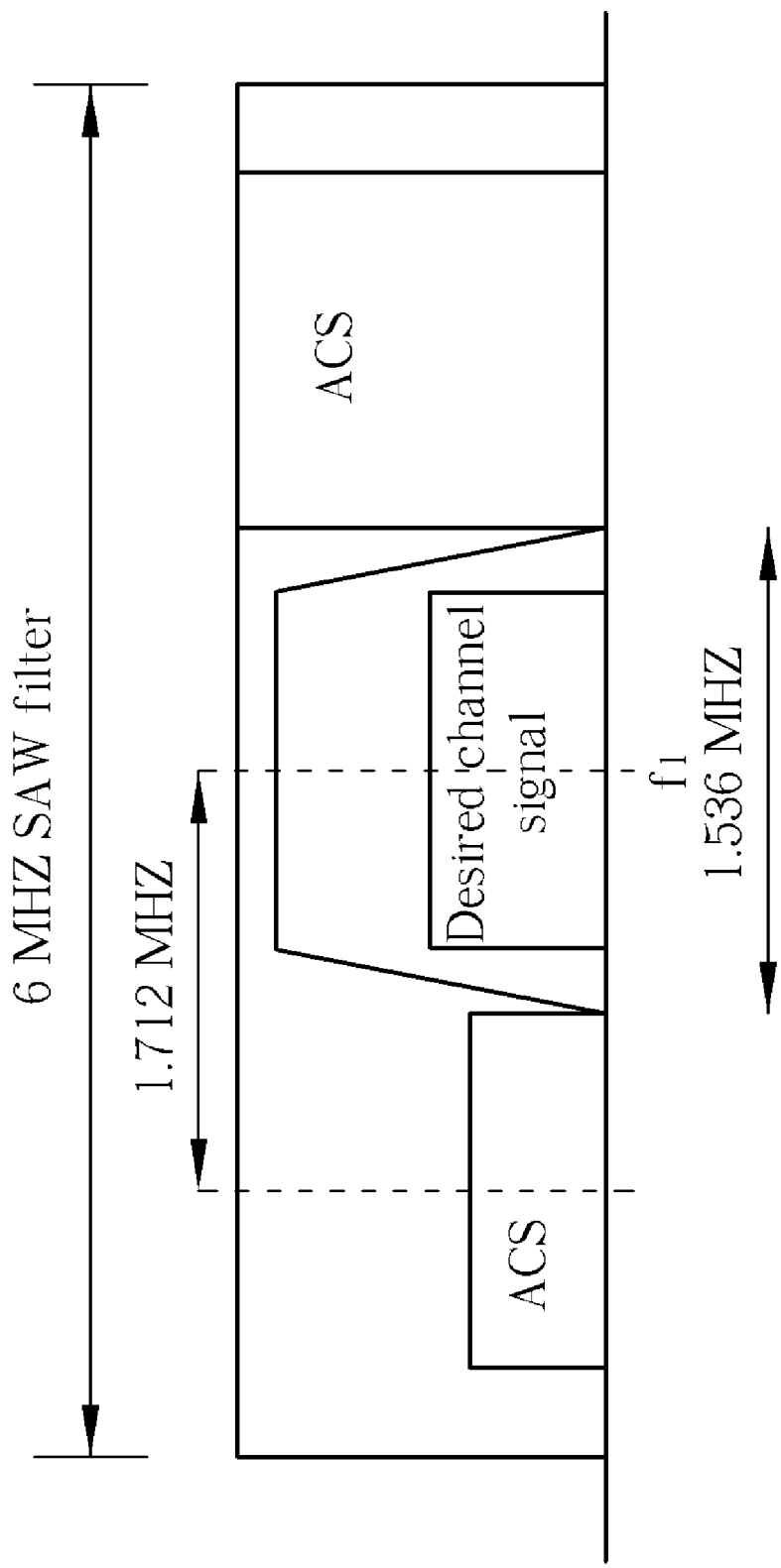
FIG. 2 is a signal receiving method according to one embodiment of the present invention.
Figure 3:
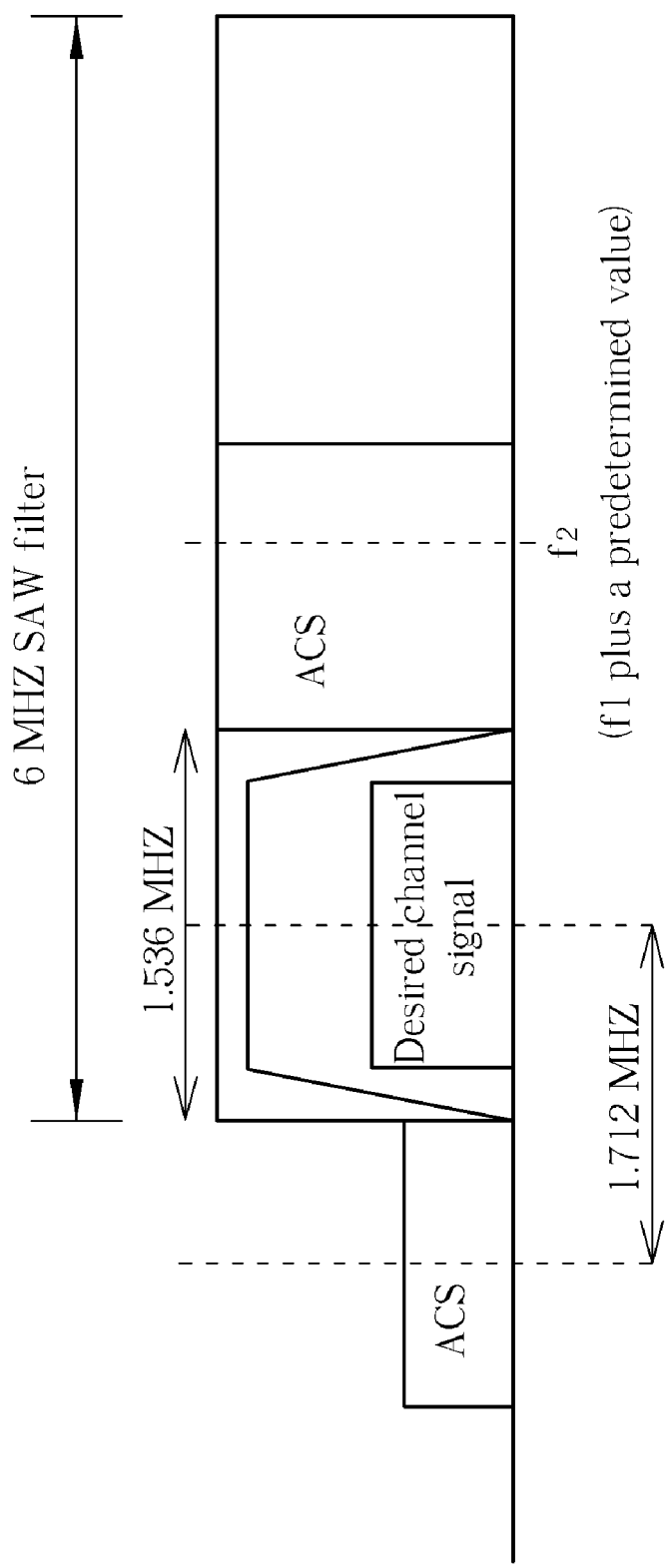
FIG. 3 is a signal receiving method according to one embodiment of the present invention.
Figure 4:
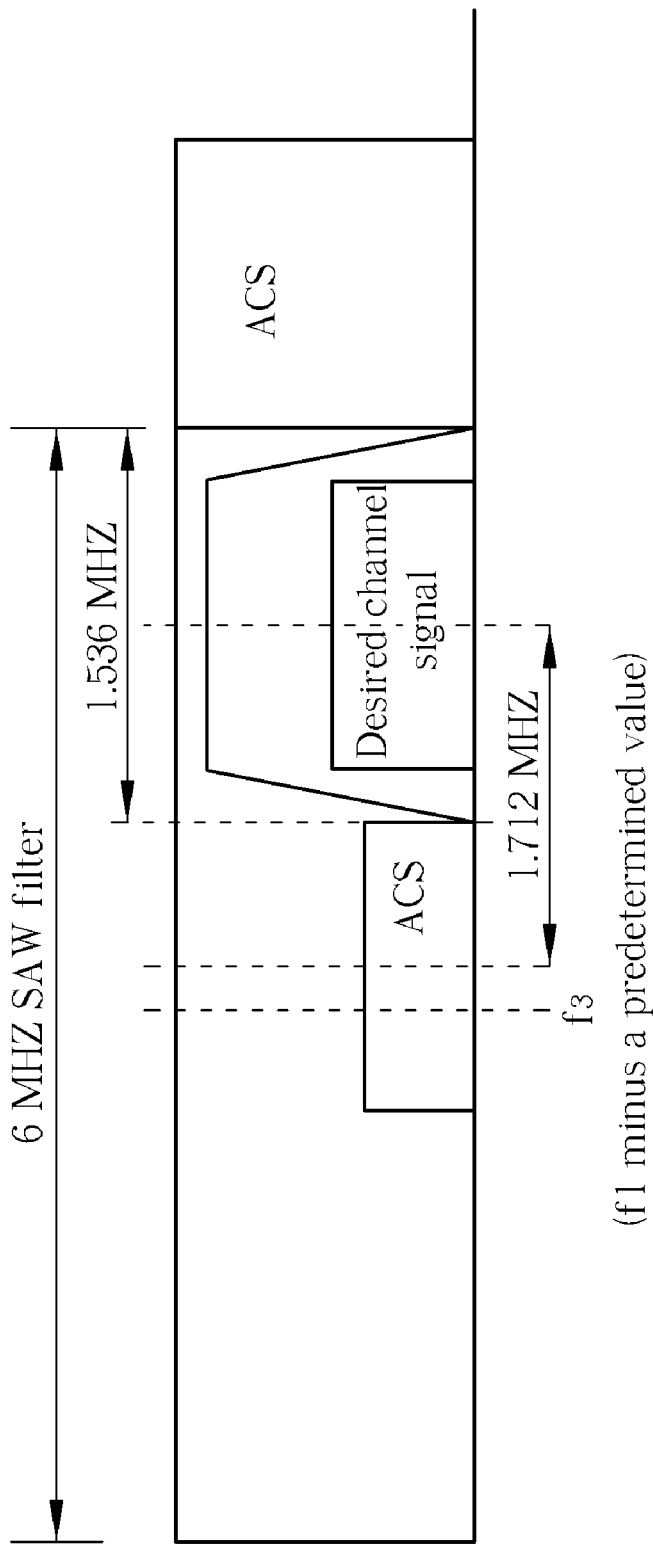
FIG. 4 is a signal receiving method according to one embodiment of the present invention.

FIG. 3 to FIG. 4 illustrate a signal receiving method according to one embodiment of the present invention. FIG. 3 illustrates the output signal (normally an intermediate frequency) of the tuner 601 in FIG. 5 according to the present invention when the frequency of the tuner 601 is adjusted to a second frequency $f_2$, which is equal to sum of a first frequency $f_1$ in FIG. 2 and a predetermined frequency. Please refer to FIG. 3, the output of the tuner 601 excludes a left ACS. After the output of the tuner 601 is converted to a baseband signal BS by the down-converter 605, a first signal quality parameter of the baseband signal is measured and recorded. After that, the tuner center frequency is adjusted to a third frequency $f_3$ which is equal to the first frequency $f_1$ subtracted by the predetermined value and the output signal of the tuner 601 is as shown in FIG. 4.

Please refer to FIG. 4, the output of the tuner 601 excludes a right ACS. After the output of the tuner 601 is converted to a baseband signal BS by the down-converter 605, a second signal quality parameter of the baseband signal is measured and recorded. Next, the method includes selecting a preferable tuner frequency and a down converter frequency according to the first and the second signal quality parameters, such that the large one of left ACS interference and right ACS interference can be avoided.

Please refer to FIGS. 2-4, the range of the SAW filter is 6 MHZ, the distance between DAB channels is 1.712 MHZ, and the bandwidth of the desired DAB signal is 1.536 MHZ. In FIG. 3, a baseband signal having a center frequency $f_2$ comprises a desired channel for transmitting a desired channel signal and right adjacent channels for transmitting ACS, wherein the frequencies of ACS are substantially larger than those of the desired channel signal. Similarly, in FIG. 4, a baseband signal having a center frequency $f_3$ comprises a desired channel for transmitting a desired channel signal and left adjacent channels for transmitting ACS, wherein the frequencies of ACS are substantially smaller than those of the desired channel signal.

It should be noted that, although above-mentioned embodiment utilizes two frequencies as an example (the second frequency $f_2$ and third frequency $f_3$), it is not meant to limit the scope of the present invention. More than two frequencies can be utilized to obtain signal quality parameters, and to obtain a preferred frequency according to the signal quality parameters, such that large ACS interference can be avoided. For example, utilizing the first frequency $f_1$, recording the corresponding signal quality parameter, and then subtracting a predetermined value, and recording corresponding signal quality parameter. Next, utilizing the first frequency plus a predetermined value and recording the corresponding signal quality parameter, and a preferred frequency can be selected according to the signal quality parameters, such that large ACS interference for signal receiving can be avoided.

Besides, in FIG. 3 and FIG. 4, although the second frequency $f_2$ and the third frequency $f_3$ fall in the ACS, it is not meant to limit the scope of the present invention. In this embodiment, the predetermined value is determined by a bandwidth of the desired channel signal (1.536 MHZ in this embodiment), a range of a SAW filter (6 MHZ in this embodiment), and a channel distance for transmitting the desired channel signal (1.712 MHZ in this embodiment). In this example, the predetermined value can be obtained via following equation:

$$\text{Predetermined Value} = \left[\frac{Saw_R}{2}\right] - \left[Dis_C - \frac{DS_B}{2}\right] = \frac{6}{2} - \left[1.712 - \frac{1.536}{2}\right] = 2.065$$

wherein $Saw_R$ indicates the range of the SAW filer, $Dis_C$ indicates a channel distance, and $DS_B$ indicates a bandwidth of the desired channel signal. Such a mechanism is used to ensure that the SAW filter can cover the desired channel signal but does not cover the right ACS or the left ACS. This is also not meant to limit the scope of the present invention.

In one embodiment, an RF signal receiving system utilizing the method shown in FIGS. 3-4 is used for receiving a target RF signal following the DAB standard. Therefore, the RF signal receiving system can utilize the same SAW filter to receive a DAB signal or a DVB-T signal. Also, the above-mentioned signal quality parameter can be a signal-to-noise ratio (SNR) or/and a bit-error rate (BER). However, such a description is only for example and does not mean to limit the scope of the present invention: for example, the RF signal receiving system can receive signals other than the DAB standard, and the predetermined value can correspond to not a target RF signal but a constant value or a random value.

Besides, the operation of the system can be dynamically monitored and the predetermined value changed accordingly, and such variations should also fall in the scope of the present invention.

Figure 5:
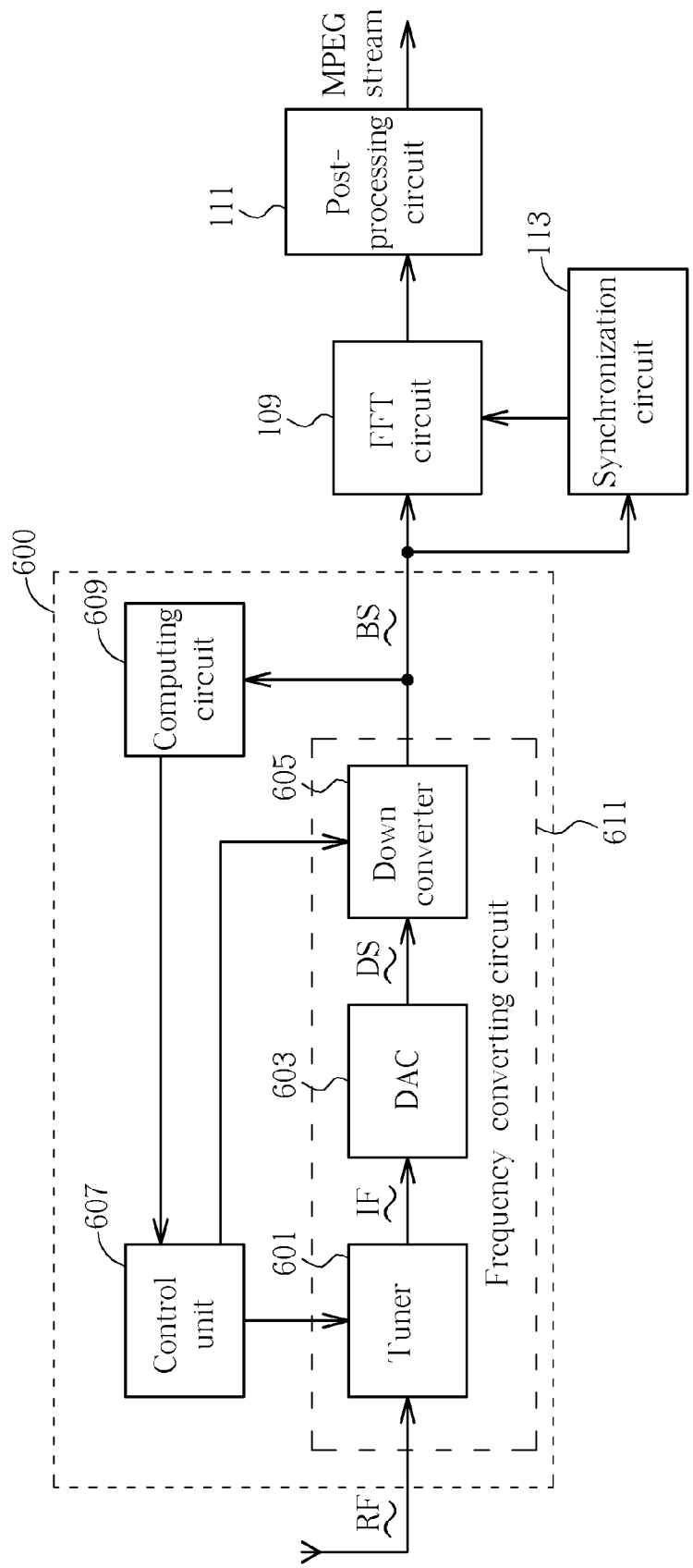
FIG. 5 is a block diagram of a signal receiving apparatus according to one embodiment of the present invention.

FIG. 5 is a block diagram of a signal receiving apparatus 600 according to one embodiment of the present invention. The signal receiving apparatus 600 comprises a tuner 601, a ADC 603, a down converter 605, a control unit 607 and a computing circuit 609. The tuner 601 converts a radio frequency (RF) signal RF to an intermediate frequency signal IF. The ADC 603 converts the intermediate frequency signal IF to a digital signal DS. The down converter 605 generates a baseband signal BS according to the digital signal DS. The control unit 607 controls the frequencies of the tuner 601 and the down converter 605, wherein the control unit 607 controls the tuner 601 to utilize different frequencies to generate a plurality of different intermediate frequency signals, and controls the down converter 605 to utilize different frequencies for generating a plurality of baseband signals corresponding to the intermediate signals. The frequency of the down converter 605 corresponds to that of the tuner 601.

The computing circuit 609, which is coupled to the control unit 607, is used for computing and storing signal quality parameters of the baseband signals, wherein the control unit 607 determines the frequencies of the tuner 601 and the down converter 605 according to signal quality parameters. In this case, the computing circuit 609 can receive at least one of the SNR and BER to output corresponding signal quality parameters. Since technique for SNR and BER is well known by persons skilled in the art, it is omitted for brevity.

As mentioned above, the tuner 601, the ADC 603, and the down converter 605 can be regarded as a frequency converting circuit 611. Therefore, the operation of the signal receiving apparatus 600 can be regarded as below:

The signal receiving apparatus 600 is used for receiving a received signal which comprises a desired channel signal, a first adjacent channel signal ACS, and a second ACS. The desired channel signal is between the first and the second ACSs, as shown in FIG. 2. Also, the strength of the first ACS is larger than that of the second ACS, Then, the frequency converting circuit 611 is used to convert the RF signal to respectively generate a first converted signal and a second converted signal with different frequencies (in this embodiment, a first baseband signal and a second baseband signal). In other words, the first converted signal comprises at least a portion of the first ACS, and the second converted signal comprises at least a portion of the second ACS.

After that, the computing circuit 609 computes signal quality parameters of the first and the second converted signals to determine which frequency the frequency converting circuit 611 should operate at. It should be noted that, corresponding to different signals to be processed, the ADC 603 can be omitted or replaced with other circuits.

In this embodiment, the frequency converting circuit 611 is used for outputting an output signal according to the control signal from the control unit 607. The output signal includes the desired channel signal and at least a portion of an ACS signal having a larger strength than others. Also, the maximum strength of the output signal is the strength of the desired channel signal. In this embodiment, the ACS signal having a larger strength than others is the second ACS, and the output signal is the second converted signal.

Briefly, the control signal is used to control the frequency converting circuit 611 to filter out at least one unwanted adjacent channel signal, and a strength of the at least one unwanted adjacent channel signal (the second ACS in this embodiment) is larger than that of the desired channel signal.

Figure 1:
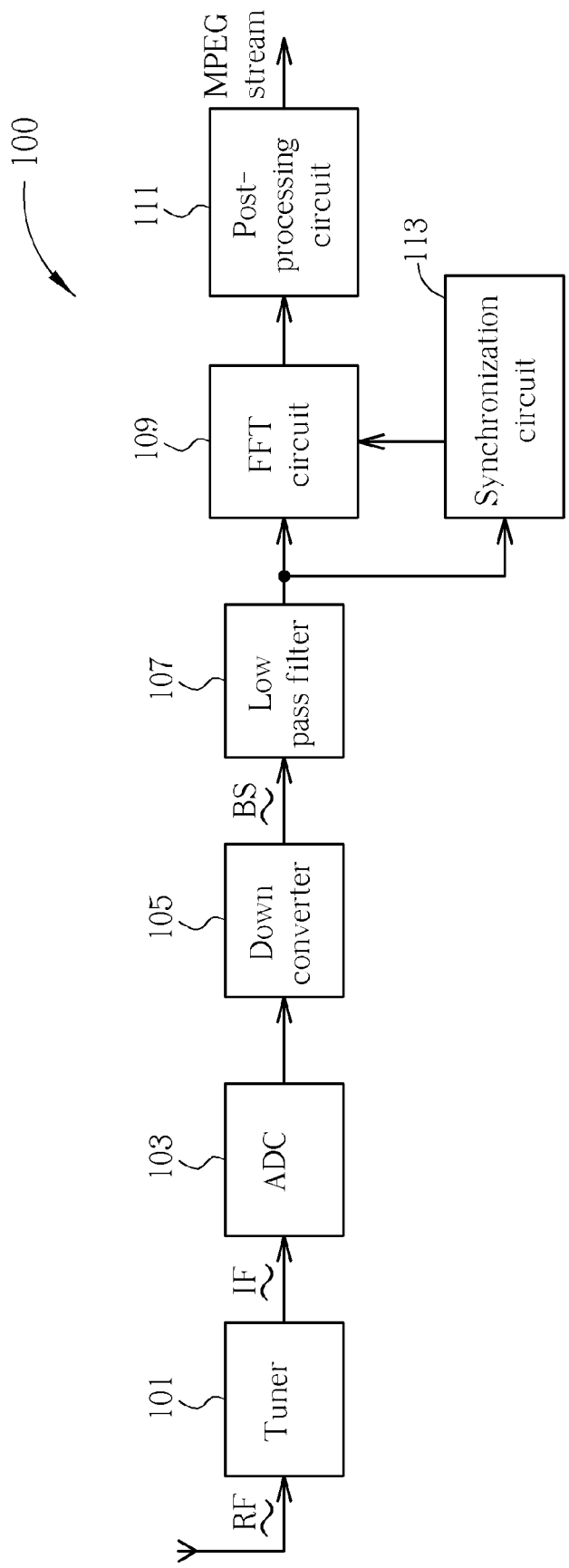
FIG. 1 illustrates a conventional receiving system for DVB-T and DAB standards.

It should also be noted that the signal receiving apparatus 600 can be utilized in the DVB-T and DAB receiving system shown in FIG. 1, but this is not meant to limit the scope of the present invention. The signal receiving apparatus 600 can be utilized in other signal receiving systems, and the ADC 603 can be omitted if the signal receiving apparatus 600 is utilized in a receiving system for analog signals. The operation thereof is described as above, and it is thus omitted for brevity.

Those skilled in the art will readily observe that numerous modifications and alterations of the device and method may be made while retaining the teachings of the invention.

What is claimed is:

1. An apparatus for receiving a received signal which comprises a desired channel signal, a first adjacent channel signal (ACS), and a second ACS, the desired channel signal being between the first and the second ACSs, the strength of the first ACS is larger than that of the second ACS, the apparatus comprising:
   a frequency converting circuit, configured to convert the received signal according to a first frequency and a second frequency to respectively generate a first converted signal and a second converted signal, wherein the first converted signal comprises at least a portion of the first ACS, and the second converted signal comprises at least a portion of the second ACS;
   a computing circuit, coupled to the frequency converting circuit, configured to determine first and second signal quality parameters according to the first and the second converted signals, respectively; and
   a control circuit, coupled to the frequency converting circuit and the computing circuit, configured to output a control signal into the frequency converting circuit according to the first and the second signal quality parameters;
   wherein the frequency converting circuit filters out the first ACS of the received signal according to the control signal to generate an output signal, which comprises the desired channel signal and at least a portion of the second ACS.

2. The apparatus of claim 1, wherein the frequency converting circuit generates the first and the second converted signals according to a first frequency and a second frequency, wherein a center frequency of the desired channel signal is between the first and the second frequencies.

3. The apparatus of claim 2, wherein the frequency difference of the center frequency of the desired channel signal and the first frequency is determined by a bandwidth of the desired channel signal, a range of a SAW filter of the tuner in the frequency converting circuit, and a channel distance.

4. The apparatus of claim 2, wherein a difference of the center frequency of the desired channel signal and the first frequency is substantially equal to a difference of the center frequency of the desired channel signal and the second frequency.

5. The apparatus of claim 1, wherein the received signal is a RF signal from an antenna, and the output signal is a baseband signal.

6. The apparatus of claim 3, wherein the frequency converting circuit further comprises:
   a tuner, coupled to the control circuit, for converting the received signal into an intermediate frequency (IF) signal according to the control signal; and
   a down converter, coupled to the control circuit, for converting the IF signal to the baseband signal.

7. The apparatus of claim 6, further comprising a Fast Fourier Translation (FFT) circuit, a synchronization circuit, and a post-processing circuit.

8. The apparatus of claim 1, wherein the computing circuit determines the first signal quality parameter according to at least one of a signal to noise ratio (SNR) and a bit error rate (BER) of the first converted signal.

9. The apparatus of claim 1, wherein the control signal is used to control the frequency converting to filter out at least one unwanted adjacent channel signal, and a strength of the at least one unwanted adjacent channel signal is larger than that of the desired channel signal.

10. The apparatus of claim 1, wherein the output signal and the second converted signal are substantially the same.

11. The apparatus of claim 1, wherein the output signal comprises the desired channel signal and at least a portion of the second ACS, and the strength of the desired channel signal is larger than that of the at least a portion of the second ACS.

12. The apparatus of claim 1, wherein the maximum strength of the output signal is the strength of the desired channel signal.

13. A method for converting a receiving signal into an output signal, the received signal comprising a desired channel signal, a first adjacent channel signal (ACS), and a second ACS, the desired channel signal being between the first and the second ACSs, the strength of the first ACS is larger than that of the second ACS, the method comprising:
   receiving the received signal;
   converting the received signal into a first converted signal according to a first frequency, wherein the first converted signal comprises at least a portion of the first ACS;
   determining a first quality parameter according to the first converted signal;
   converting the received signal into a second converted signal according to a second frequency, wherein the second converted signal comprises at least a portion of the second ACS;
   determining a second quality parameter according to the second converted signal;
   generate the output signal according to the first and the second quality parameters, wherein the maximum strength of the output signal is the strength of the desired channel signal.

14. The method of claim 13, wherein a center frequency of the desired channel signal is between the first and the second frequencies.

15. The method of claim 14, wherein the frequency difference of the center frequency of the desired channel signal and the first frequency is determined by a bandwidth of the desired channel signal, a range of a SAW filter, and a channel distance.

16. The method of claim 14, wherein a difference of the center frequency of the desired channel signal and the first frequency is substantially equal to a difference of the center frequency of the desired channel signal and the second frequency.

17. The method of claim 13, wherein the received signal is a RF signal from an antenna, and the output signal is a baseband signal.

18. The method of claim 13, wherein the first signal quality parameter is determined according to at least one of a signal to noise ratio (SNR) and a bit error rate (BER) of the first converted signal.

19. The method of claim 13, wherein the output signal and the second converted signal are substantially the same.

20. An apparatus for receiving a received signal which comprises a desired channel signal, a first adjacent channel signal (ACS), and a second ACS, the desired channel signal being between the first and the second ACSs, the strength of the first ACS is larger than that of the second ACS, the apparatus comprising:

a frequency converting circuit, configured to convert the received signal to generate a first converted signal and a second converted signal, wherein the first converted signal comprises at least a portion of the first ACS, and the second converted signal comprises at least a portion of the second ACS;

a computing circuit, coupled to the frequency converting circuit, configured to determine first and second signal quality parameters according to the first and the second converted signals, respectively; and a control circuit, coupled to the frequency converting circuit and the computing circuit, configured to output a control signal according to the first and the second signal quality parameters;

wherein the frequency converting circuit generates the output signal according the control signal, and the maximum strength of the output signal is the strength of the desired channel signal.

* * * * *